United States Patent [19]

Hollenberg

[11] Patent Number: 5,512,145
[45] Date of Patent: Apr. 30, 1996

[54] ENERGY CONVERSION SYSTEM

[75] Inventor: Joel W. Hollenberg, Suffern, N.Y.

[73] Assignee: The Cooper Union for the Advancement of Science and Art, New York, N.Y.

[21] Appl. No.: 319,610

[22] Filed: Oct. 7, 1994

[51] Int. Cl.$^6$ .................................................. C25B 1/02
[52] U.S. Cl. .................. 205/628; 136/206; 136/248; 136/291; 136/293; 204/228; 204/266; 204/278; 204/DIG. 4; 60/641.8; 290/1 R; 205/343
[58] Field of Search .................... 136/206, 248, 136/291, 293; 204/129, 228, 266, 278, DIG. 4; 60/641.8; 290/1 R

[56] References Cited

U.S. PATENT DOCUMENTS 4,021,323   5/1977   Kilby et al. ..................... 204/129

(List continued on next page.)

FOREIGN PATENT DOCUMENTS 2810913   9/1979   Germany ..................... 136/291
3231366   3/1984   Germany ..................... 204/129

OTHER PUBLICATIONS

"Operation & Installation Guide", Model LCB-20 Linear Current Booster, Bobier Electronics/Sun Selector, Parkersburg, WV 26101.

Winter, C.-J., "Solar Hydrogen, Energy Carrier for the Future Exemplified by Two Field Programs: Hysolar and Solar-Wasserstoff-Bayern (SWB)", *Renewable Energy*, vol. 5, Part 1, pp. 69–76, 1994.

Khouzam, K. Y., "The Load Matching Approach to Sizing Photovoltaic Systems With Short–Term Energy Storage", *Solar Energy*, vol. 53, No. 5, pp. 403–409, 1994.

Freudenberg, K., "Solar Generator Performance With Load Matching to Water Electrolysis", *Applied Phyics.*, A28, pp. 205–209, 1982.

Lund, P. D., "Optimization of Stand–Alone Photovoltaic Systems With Hydrogen Storage for Total Energy Self–Sufficiency", *International Journal of Hydrogen Energy*, vol. 16, No. 11, 1991. (Abstract).

Steeb, H., et al., "Solar Hydrogen Production: Photovoltaic–Electrolyzer–System With Active Power Conditioning", Proc. 5th World Hydrogen Energy Conference, Canada, 1984, pp. 109–119.

McElroy, J. F., "Recent Advances in SPE Water Electrolyzer", *J. of Power Sources*, 47, pp. 369–375, 1994.

El-Bassuoni, A.-M., et al., "Hydrogen and Fresh Water Production From Sea Water", *International Journal of Hydrogen Energy*, vol. 7, No. 12, pp. 919–923, 1982.

Cameron, D. S., "World Developments of Fuel Cells", *International Journal of Hydrogen Energy*, vol. 15, No. 9, pp. 669–675, 1990.

Prater, K. B., "Polymer Electrolyte Fuel Cells: A Review of Recent Developments", *Journal of Power Sources*, 51, pp. 129–144, (1994).

Petrov, K. M. et al., "Water Post–Treatment Without Expandables—Proton Exchange Membrane Based Electrolysis System", *International Journal of Hydrogen Energy*, vol. 18, No. 5, pp. 377–382, 1993.

Vanhanen, J. P., et al., "Simulation of Solar Hydrogen Energy Systems", *Solar Energy*, vol. 53, No. 3, 1994. (Abstract).

Lutfi, N. and Veziroglu, T. N., "A Clean and Permanent Energy Infrastructure for Pakistan: Solar–Hydrogen Energy System", *International Journal of Hydrogen Energy*, vol. 16, No. 3, pp. 169–200, 1991.

*Primary Examiner*—Aaron Weisstuch
*Attorney, Agent, or Firm*—William S. Frommer

[57] ABSTRACT

This invention relates to a method and apparatus for converting energy to hydrogen gas using an electrolyzer and a metal alloy hydride tank for hydrogen storage, wherein a passive load matching device between the energy source and the electrolyzer maximizes hydrogen output, and the electrolyzer and the metal alloy hydride tank operate at mutually low pressure, near ambient, such that pressurization of the system is not required.

61 Claims, 8 Drawing Sheets

U.S. PATENT DOCUMENTS

| | | | |
|---|---|---|---|
| 4,160,816 | 7/1979 | Williams et al. | 423/648.1 |
| 4,161,657 | 7/1979 | Shaffer, Jr. | 290/1 R |
| 4,246,080 | 1/1981 | Shinn | 204/129 |
| 4,326,013 | 4/1982 | Jacobi et al. | 429/20 |
| 4,341,607 | 7/1982 | Tison | 204/129 |
| 4,841,731 | 6/1989 | Tindell | 60/641.8 |
| 4,847,546 | 7/1989 | Bobier et al. | 320/21 |
| 4,910,963 | 3/1990 | Vanzo | 60/641.8 |
| 5,219,671 | 6/1993 | Parker et al. | 429/17 |

ENERGY CONVERSION SYSTEM

FIELD OF THE INVENTION

This invention relates to a method and apparatus for converting energy to hydrogen gas and the storage of the hydrogen gas in metal alloy hydride tanks. More particularly, this invention relates to solar energy conversion.

BACKGROUND OF THE INVENTION

Concerns about the availability of fossil fuel energy resources and pollution caused by the use of gas, oil, coal, and nuclear power have prompted research to attempt to develop viable alternate energy sources such as solar, wind, and geothermal energy. For illustration purposes, the following discussion focuses on the techniques and problems associated with solar energy. However, it is understood that the present invention can be utilized with wind and geothermal energy, as well as with conventional sources of power.

Since solar energy is pollution free, has an inexhaustible source, and can be captured with comparatively inexpensive equipment, it is a very promising alternate energy source. Solar energy is broadly defined as electricity which is generated from radiant light (electromagnetic energy) of the sun striking a photovoltaic cell.

Although solar energy is a promising energy source, one drawback of solar energy is that by its very nature it is a variable power source. This variability is caused not only by the lack of a power source during the night, but also by changes in the incidence of light relative to the earth's surface during seasonal change, and by atmospheric variables such as changing weather conditions, smog, dust, and the like. This variable nature of solar energy creates difficulties, particularly since most energy and power usages require dependable and continuous sources of energy. Thus, solar energy must be stored to make it available when required.

Various techniques of storage have been developed. One common storage technique is the use of storage batteries. However, storage batteries are expensive, difficult to maintain, of limited life, and the toxic substances used in batteries create a disposal problem when the battery storage capacity is exhausted.

Another storage technique uses the electrical energy generated from a photovoltaic cell to produce hydrogen gas from water, and the hydrogen is stored and later used to produce energy when needed. The production of hydrogen from water generally consists of transmitting electrical energy to electrodes within an electrolyzer to induce an electric potential difference which disassociates water into hydrogen and oxygen. The electrolyzer generally contains pure water having as electrolyte of sodium hydroxide or potassium hydroxide. These electrolytes are not destroyed nor do they need to be replenished during the operation of the electrolyzer. Thus, even though the electrolysis action may take place intermittently, the hydrogen produced can be maintained in storage and turned back into electrical energy (either by combustion or by use of a fuel cell) during times of little or no solar radiant light. Therefore, the variable character of solar energy will have no or little affect on the desired electrical output.

One of the more efficient electrolyzers presently available is a solid polymer electrolyte ("SPE") unit. These units basically consist of two electrodes, an anode and a cathode, placed in a perfluorinated sulfonic acid polymer. The electrodes are connected through an external circuit to a power supply. Water is broken down at the anode into oxygen, hydrogen ions and electrons. The electrons flow through the external circuit to the cathode while the hydrogen ions flow through the electrolytic polymer to the cathode where they combine with the electrons and form hydrogen. The equations at the anode and cathode are:

$$H_2O \rightarrow 2H^+ + \tfrac{1}{2}O_2 + 2e^-$$

$$2H^+ + 2e^- \rightarrow H_2$$

The overall reaction is thus:

$$H_2O \rightarrow H_2 + \tfrac{1}{2}O_2$$

The by-product of this process is an effluent containing trace hydrofluoric acid, oxygen gas and excess water.

SPE electrolyzers are one of the two main types of electrolyzers available. SPE electrolyzers are also known as PEM, or Proton Exchange Membrane, for the way in which they split water. The other type, liquid electrolyte ("LE") electrolyzers, uses as its electrolyte a strong acidic or basic solution, typically potassium hydroxide. However, there are a number of advantages that an SPE electrolyzer has over LE electrolyzers. The concentration of the solution in an LE electrolyzer must be maintained at a constant level for the electrolytic reaction to take place, while SPE electrolyzers maintain constant concentration over their life. SPE electrolyzers are also safer, since they do not require a supply of a strong highly corrosive basic solution as do LE electrolyzers.

The hydrogen gas produced is a storable, transportable, clean, and non-polluting fuel. However, hydrogen has the fundamental limitation of being difficult to store. Hydrogen has a boiling point of −252.87° C. and a density of 0.09 grams per liter. This means that in order to store hydrogen in reasonable sized tanks, it must be stored either under pressure, at low temperature, or both. Unfortunately, it takes energy to create high pressures and low temperatures. Thus, the overall efficiency and cost effectiveness of producing and storing hydrogen is reduced.

In order to overcome the hydrogen storage problem, it has been found that hydrogen can be stored in a solid form via "rechargeable" metal hydrides, such as iron-titanium-manganese ($Fe_{44}Ti_{55}Mn_5$) alloy, mischmetal-nickel aluminum hydriding ($Mn_{0.97}Ni_{4.5}Al_{0.5}$) alloy, and the like. This can best be described by the reversible chemical reaction of a solid metal hydride(Me) with gaseous hydrogen ($H_2$) to form a solid metal hydride ($MeH_x$):

$$\tfrac{2}{x} Me + H_2 \leftrightarrows \tfrac{2}{x} MeH_x + heat$$

The forward or exothermic reaction is characteristic of the charging (absorption) of hydrogen to the hydride while the reverse or endothermic reaction is the discharging (desorption) of hydrogen from the metal hydride. Among the many advantages of hydrogen storage via a metal hydriding alloy, the most significant is the low charging and discharging pressures required to hydride which lessens the risk of leakage and explosion associated with storing hydrogen as a compressed gas.

When examining the thermodynamic aspects of the reversible metal-hydrogen reaction, it is advantageous to determine the absorption and desorption properties of metals from pressure-composition isotherms. The abscissa of such isotherms is typically in the form of a hydrogen atoms to metal atoms ratio ("H/M"). FIG. 1 shows the ideal absorption-desorption pressure-composition isotherm for a metal-hydrogen system where the plateau pressure ("$P_p$") 30 is shown connecting points B and C. Once the plateau pressure is reached, the majority of the absorption or desorption of hydrogen takes place at this constant pressure $P_p$. The curves connecting points A and B as well as points C and D show that for a large increase or decrease in pressure, the amount of hydrogen absorbed or desorbed is small.

In reality, while such isotherms as shown in FIG. 1 might be achievable, most hydrides deviate from this ideal behavior. In addition to the fact that the plateau region slopes and the boundaries of this region are not as well defined, there also exists hysteresis between absorption and desorption curves. For ideal hydrides, there is no means by which to measure the composition of the hydride when located along the plateau pressure; but the slope in the isotherm for real metals makes finding the hydrogen to metal ratio as simple as knowing the temperature and pressure of the hydride.

The plateau pressure $P_p$ is related to the absolute temperature of the reaction, $T_R$, by the Van't Hoff equation:

$$\ln(P_p) = \frac{\Delta H}{R_u T_R} - \frac{\Delta S}{R_u}$$

where $\Delta H$ is the change in enthalpy, $\Delta S$ is the change in entropy and $R_u$ is the universal gas constant. From the Van't Hoff relationship one can determine the charging and discharging pressures and temperatures of the tank.

Experimental work into hydrogen storage for photovoltaic systems has been performed at Brookhaven National Laboratories. This experimental work has been published in Schoener et al., "An Integrated Test Bed For Advanced Hydrogen Technology: Photovoltaic Array/Electrolyzer System," BNL51577 Brookhaven National Laboratory (1982), Leigh et al., "Photovoltaic-electrolyzer System Transient Simulation Results," BNL40081 Brookhaven National Laboratory (1983), and Metz et al., "Photovoltaic-powered Solid Polymer Electrolyte (SPE) Electrolyzer System Evaluation," BNL51940 Brookhaven National Laboratory (1982). The system of the prior art consisted of a 5 kW photovoltaic array, a 15 kW advanced technology electrolyzer, and an iron-titanium hydride tank with a storage capacity of 50 lbs or 8600 standard $ft^3$ of hydrogen. This Brookhaven system used a power conditioner between the photovoltaic array and electrolyzer that also drew power from local utilities to supplement the 5 kW array. This was done to allow the advanced technology electrolyzer to be operated off the utilities for baseline constant power testing, and to simulate a 100% solar power source. It was found that use of an active power conditioner would entail losses ranging from 21–29%.

A similar analytical model for a photovoltaic array-electrolyzer system was constructed at the Institute for Technical Physics in West Germany. The results from this model were published in Carpetis, C., "An Assessment of Electrolytic Hydrogen Production by Means of Photovoltaic Energy Conversion," Int'l J. Hydrogen Energy, Vol. 9, No. 12 (1990) pp. 969–991. From the Carpetis model, it was determined that the use of a power conditioner would not improve system performance, since it would increase power losses from 5% without conditioning to 5–10%.

Since 1990, the Department of Technical Physics at the Helsinki University of Technology has undertaken a three-year project to investigate hydrogen energy technologies for solar energy systems at high latitudes. The results of this project were published in Kauranen et al., "Hydrogen Energy Storage for Photovoltaic Systems," Helsinki University of Technology, Dept. of Technical Physics (1990).

The goal of the project was to develop the required technologies and demonstrate the technical feasibility of a hydrogen storage system with electrolytic hydrogen production and electrical power production using hydrogen fuel. A pilot system is currently being constructed for a 1–4 kW-hr daily load. The system disclosed uses battery storage and pressurized hydrogen storage, and achieves load matching by switching components on and off.

A similar project was also undertaken at Humboldt State University in Arcata, Calif., with the Schatz Solar Hydrogen Project. The results of the California project were published in "Project Hydrogen '91: Technical Proceedings," Amer. Acad of Science (1992). The California system consisted of a 9.2 kW photovoltaic array connected in parallel to a 24 VDC, 37-A.hr nickel-cadmium battery and a Teledyne Energy ALTUS 20™ liquid potassium-hydroxide electrolyte electrolyzer capable of producing 20 slpm of hydrogen and 10 slpm of oxygen. The hydrogen and oxygen were used to drive an Ergenics 1.0 kW fuel cell, and when the fuel cell was not in use, the hydrogen and oxygen were stored as compressed gases in separate tanks.

Finally, photovoltaic energy storage in the form of hydrogen fuel has also found application as a means of vehicle propulsion. One noteworthy project currently under development is the LaserCel™ prototype vehicle at The American Academy of Science. The results of this LaserCel™ project were published in "Project Hydrogen '91: Technical Proceedings," Amer. Acad of Science (1992). A subcompact car (modification of a Ford "Fiesta") was powered by a LaserCel™ inhouse-developed SPE hydrogen-air fuel cell, driving an electric motor coupled to the wheels using a standard transmission. The hydrogen was stored as a metallic hydride in tanks containing an iron-titanium-manganese ($Fe_{44}Ti_{55}Mn_5$) alloy, and a gas compressor was used to raise the hydrogen and air to the operating pressure of the fuel cell. Heat exchange to extract or store hydrogen from the tanks was achieved using thermoelectric heat pumps, and the fuel cell could be operated in reverse as an electrolyzer to produce hydrogen (from a specially designed water supply built into the vehicle) for storage. Solar panels could be mounted on the vehicle so that it can literally produce its own fuel in this fashion (under favorable sunlight conditions). The vehicle was said to have a range of 300 km, extendable to 500 km, and great emphasis was made of the fact that hydrogen consumption in a fuel cell is two to three times more efficient than burning it in an internal combustion engine.

As it can be seen, although the technologies for the collection and use of photovoltaic energy, electrolysis, and the storage of hydrogen in various forms are established either theoretically or by actual applications, virtually no work has been done in combining the three technologies into an integrated hydrogen production and storage system for photovoltaic energy conversion to achieve a viable means for the production of hydrogen in an efficient manner.

Thus, there is a need for an apparatus for hydrogen production from alternate energy sources in an efficient manner and which is able to store hydrogen in a manner which does not require a substantial consumption of energy.

OBJECTS OF THE INVENTION

A primary object of this invention is to provide an apparatus and method for producing hydrogen efficiently from an alternate energy source.

It is a further object of this invention to provide an apparatus and method for producing hydrogen efficiently from an alternate energy source which includes an electrolyzer for disassociation of water into hydrogen and oxygen from the energy received from the alternate energy source with a means for regulating the electrical input to the electrolyzers to maximize the hydrogen production.

It is still a further object of this invention to provide an apparatus and method for producing hydrogen efficiently from an alternate energy source which includes an electrolyzer for disassociation of water into hydrogen and oxygen from the energy received from the alternate energy source and metal hydride tanks for storing hydrogen wherein the electrolyzer and metal hydride source tanks are designed to operate at near atmospheric pressure.

It is yet a further object of this invention to provide an apparatus and method for producing hydrogen efficiently from an alternate energy source which includes an electrolyzer for disassociation of water into hydrogen and oxygen from the energy received from the alternate energy source with a means for regulating the electrical input to the electrolyzers to maximize hydrogen production, and which further includes metal hydride tanks for storing hydrogen wherein the electrolyzer and metal hydride tanks are designed to operate at near atmospheric pressure.

The above and other objects, features and advantages of this invention will be apparent in the following detailed description of illustrative embodiments thereof.

SUMMARY OF THE INVENTION

This invention relates to a method and apparatus for converting energy to hydrogen gas and the storage of the hydrogen gas in metal alloy hydride tanks. More particularly, this invention relates to solar energy conversion.

In an effort to overcome the numerous disadvantages associated with the production and storage of hydrogen gas generated from alternate energy sources, particularly variable type alternate energy sources, and to address the problem of storing photovoltaic energy for use during periods of inadequate or no sunlight, the present invention utilizes a novel apparatus for efficiently producing and storing hydrogen fuel which can be used as an environmentally-safe fuel for both heating and electric power generation.

The invention primarily is comprised of four components. First, an energy collector, such as a photovoltaic array used to collect solar energy and convert it to electrical power, a windmill used to collect wind power and convert it to electrical power, and the like. This component includes a passive load matching device (linear current booster) to convert excess voltage from the energy collector to current, and to maintain the output voltage at a constant value. Second, an electrolyzer which receives direct current ("DC") electric input from the energy collector to power electrolyzer cells that generate hydrogen from water. Third, a hydrogen store, such as a solid metallic alloy hydride which stores hydrogen through a reversible chemical process. Fourth, a hydrogen consumption device, such as a burner or a fuel cell which consumes the hydrogen released from the tanks (using a heat exchange process) to provide electricity.

An important feature of the present invention is the use of a passive load matching device (linear current booster) between the photovoltaic array and the electrolyzer to convert excess voltage as may be produced by the photovoltaic panel to current. Another feature is matching the specifications of the electrolyzer to the hydriding and dehydriding reactions occurring with the metal hydride to allow the system to operate at sufficiently low pressures (near ambient) and thereby eliminate the need for holding the system under pressure.

The hydrogen produced is stored as a solid hydride when not in use, which eliminates the inconveniences and hazards associated with storing hydrogen as a compressed gas. Operating the solid hydride storage system and electrolyzer at low pressures lessens the chance of leakage and explosion, allows simpler sealing configurations, allows for the use of less expensive construction materials, lessens the chance of structural fatigue, allows for easy assembly of the entire system, and eliminates compressor pulsations and/or vibrations which can cause structural damage and leakage.

A significant advantage of the system is that hydrogen is produced in a steady supply using only water and either solar energy, wind power, or the like, which are practically inexhaustible.

An attractive aspect of the use of photovoltaic energy in the formation of hydrogen fuel is that hydrogen is environmentally benign. It can be burned in air without producing excessive amounts of greenhouse gases or other pollutants attributed to hydrocarbon or fossil fuels. Hydrogen can also be used to power a fuel cell to generate electricity directly, with the only by-product being water. The present invention can thus demonstrate the potential of hydrogen fuel as an alternate source of energy when produced in this safe and clean manner.

BRIEF DESCRIPTION OF THE DRAWINGS

While the specification concludes with claims particularly pointing out and distinctly claiming that which is regarded as the present invention, the objects and advantages of this invention can be more readily ascertained from the following description of the invention when read in conjunction with the accompanying drawings in which:

DETAILED DESCRIPTION OF THE INVENTION

As discussed previously, this invention relates to a method and apparatus for converting energy to hydrogen gas and the storage of the hydrogen gas in metal alloy hydride tanks.

More particularly, this invention relates to solar energy conversion.

Figure 1:
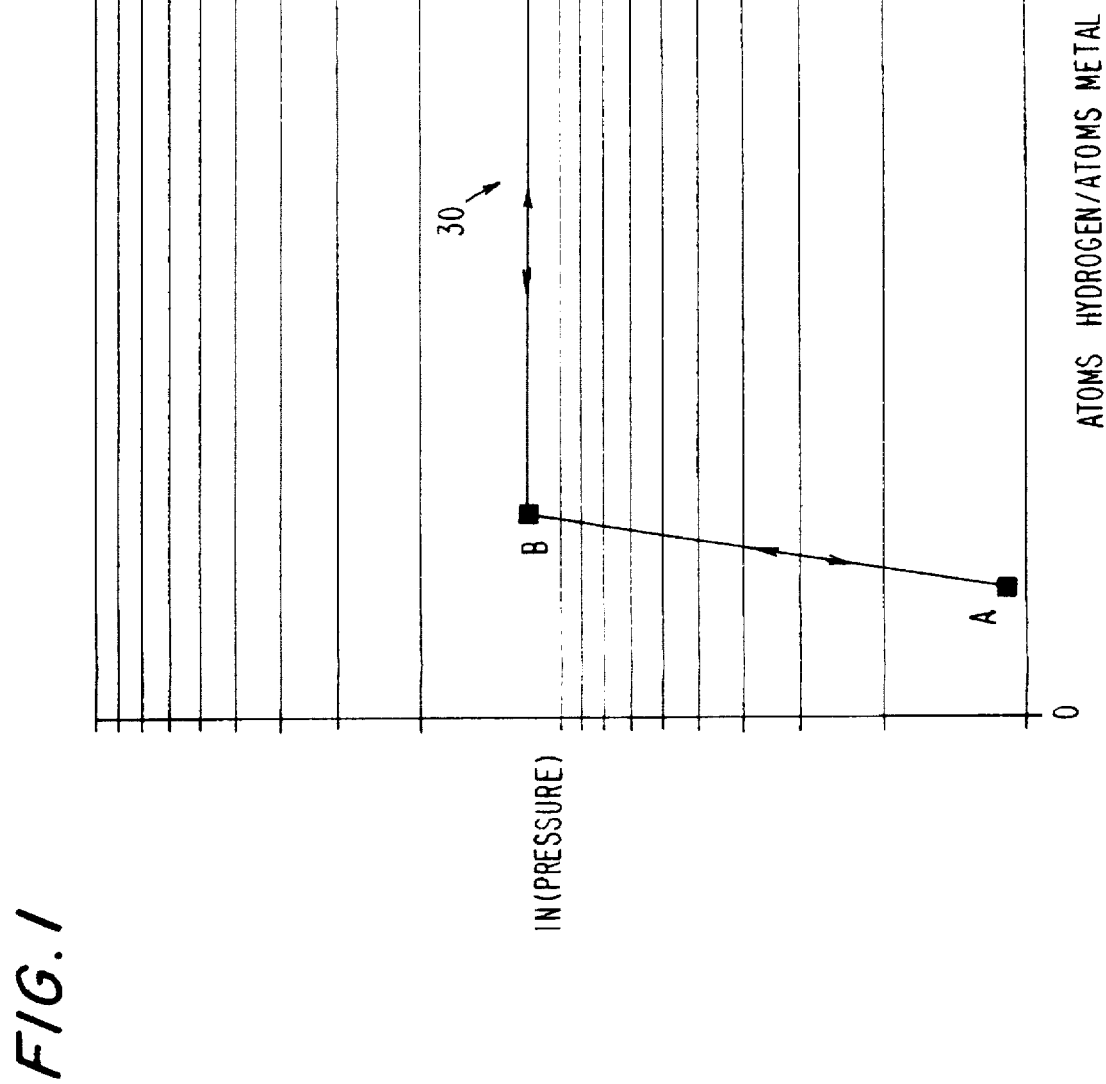
FIG. 1 is a plot showing the ideal absorption-desorption pressure-composition isotherm for a metal-hydrogen system.
Figure 2:
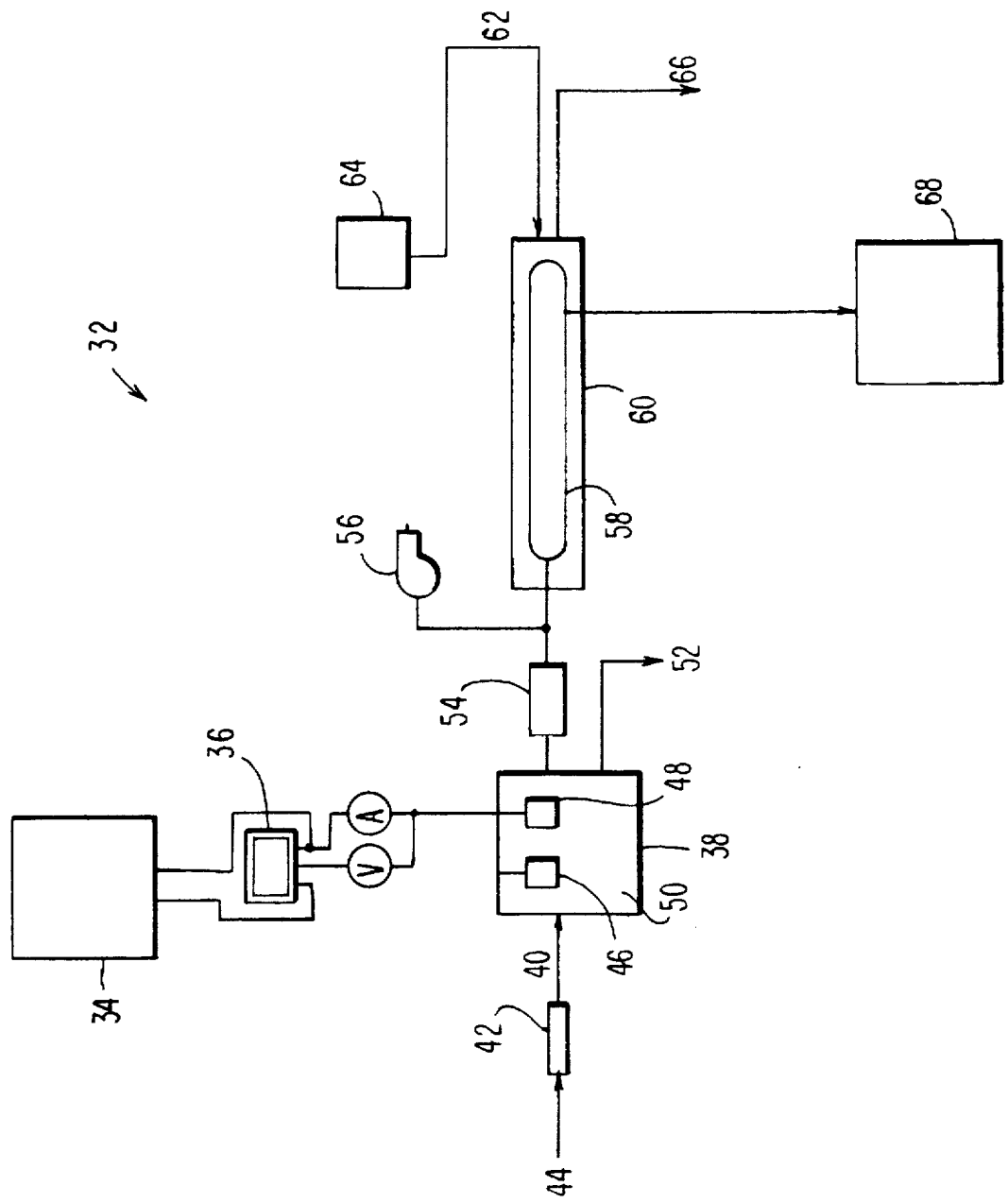
FIG. 2 is a schematic illustration of the basic apparatus of the present invention.

In FIG. 2, a hydrogen gas generation apparatus 32 is schematically illustrated. An energy source 34, such a photovoltaic array collecting solar energy, an electrical generator powered by a windmill, or the like, is electrically connected to a passive load matching device (linear current booster) 36. The output current from the energy source 34 is conditioned through the passive load matching device 36 which couples the energy source 34 to an electrolyzer 38, preferably a solid polymer electrolyte (perfluorinated sulfonic acid) electrolyzer, which uses the energy from the energy source 34 to disassociate water into hydrogen and oxygen. The passive load matching device 36 provides adequate load-matching between the energy source 34 and the electrolyzer 38, of the unsteady power generated by the energy source, and converts excess voltage to current. Since hydrogen production from the electrolyzer 38 is directly dependent on the electrical current supplied by the energy source 34, an increase in hydrogen production results from the current-boosting capability of the passive load matching device 36.

Deionized water 40 is supplied to the electrolyzer 38 from a deionizer 42 which deionizes a water supply 44. The water supply 44 can be either fresh water or sea water. The deionized water 40 is supplied to the electrolyzer 38 for disassociation into hydrogen and oxygen. The electrolyzer 38 includes an anode 46 and a cathode 48, placed in a perfluorinated sulfonic acid polymer 50. At least one of electrodes 46 and 48 is electrically connected via the passive load matching device 36 to the energy source 34. When power is delivered from the energy source 34 to the electrolyzer 38, the deionized water is broken down at the anode 46 into oxygen, hydrogen ions and electrons. The electrons flow through the external circuit to the cathode 48 while the hydrogen ions flow through the electrolytic polymer 50 to the cathode 48 where they combine with the electrons and form hydrogen. The equations at the anode 46 and cathode 48 are:

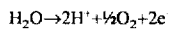

$H_2O \rightarrow 2H^+ + \frac{1}{2}O_2 + 2e$

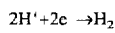

$2H^+ + 2e \rightarrow H_2$

The overall reaction is thus:

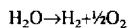

$H_2O \rightarrow H_2 + \frac{1}{2}O_2$

The by-product of this process is an effluent 52 containing trace hydrofluoric acid, oxygen gas and excess water. It is noted that the oxygen can be recovered as a product.

The electrolytically generated hydrogen is dried of its water vapor content, then purified by purifier 54 to less than 10 ppm impurities. Numerous means of purification can be used. However, molecular sieves and desiccators, such as a Matheson PF-H2 PURIFILTER™ or a Supelco OMI™-1 indicating purifier, are preferred.

Once purified, the hydrogen gas is delivered to a hydrogen storage tank 58 at pressures produced by the electrolyzers 38, preferably in the range of 0–100 psig. A vacuum pump 56 is optionally included between the electrolyzer 38 and the hydrogen storage tank 58 for purging the hydrogen flowpath as part of the startup procedure.

The hydrogen storage tank 58 is preferably composed of multiple tubes containing "rechargeable" metal hydrides, such as iron-titanium-manganese alloy, mischmetal-nickel aluminum hydriding alloy, and the like. Preferably, the multiple tubes of the hydrogen storage tank 58 are filled with a mischmetal-nickel aluminum hydriding alloy whose chemical composition is given by $Mn_{0.97}Ni_{4.5}Al_{0.5}$, commercially known as HYSTOR-208™, which has ability to charge and discharge at readily available cooling and heating water temperatures (between 40° F. to 200° F.). The hydrogen storage tank 58 is surrounded by a water jacket 60 that facilitates heat exchange during absorption and desorption of hydrogen gas in and out the metal hydride. The hydrogen storage tank 58 is preferably oversized in comparison to the hydrogen producing capacity of the electrolyzer 38, so the heat of reaction during hydriding from the electrolyzer output results in a negligible cooling water temperature rise using normal water flow rates through the water jacket 60.

Hydrogen energy storage in a solid form via a "rechargeable" metal hydride can best be described by the reversible chemical reaction of a solid metal hydride (Me) with gaseous hydrogen ($H_2$) to form a solid metal hydride ($MeH_x$):

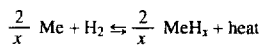

$$\frac{2}{x} Me + H_2 \leftrightarrows \frac{2}{x} MeH_x + heat$$

The forward or exothermic reaction is characteristic of the charging (absorption) of hydrogen to the hydride while the reverse or endothermic reaction is the discharging (desorption) of hydrogen from the metal hydride. Among the many advantages of hydrogen storage via a metal hydriding alloy, one of the more significant is the low charging and discharging pressures required to hydride. The preferred metal hydride for use in the hydrogen storage tank 58, a mischmetal-nickel aluminum alloy with the molecular formula $Mn_{0.97}Ni_{4.5}Al_{0.5}$, has the ability to charge in a low pressure range. It was also found that the preferred electrolyzer 38, namely the solid polymer electrolyte (perfluorinated sulfonic acid) electrolyzer, has a low electrolytically generated pressure range such that the metal hydride can be charged without the need for pressurization via an external compressor.

The hydrogen gas reacts with the metal alloy granules in the hydrogen storage tank 58 at a specific temperature and pressure according to the Van't Hoff equation, liberating heat in the process. Heat, preferably in the form of hot water 62 provided by an external water heating source 64, can be supplied to the hydrogen storage tank 58 via the water jacket 58 to discharge the hydrogen gas from the metal hydride for utilization as required. The used hot water 62 exits the water jacket 58 via water drain 66. The hydriding and dehydriding reactions in the preferred metal hydride, mischmetal-nickel aluminum alloy, occur at convenient temperatures and at pressures.

Once the hydrogen is stored, it can be later be sent for use in a hydrogen converter 68. The hydrogen converter 68 preferably is a hydrogen engine where hydrogen is burned in air for heat or for generating electricity, without producing excessive amounts of greenhouse gases or other pollutants attributed to hydrocarbon fuels. Alternatively, the hydrogen converter 68 may a fuel cell to generate electricity directly, with the only by-product being water.

Figure 3:
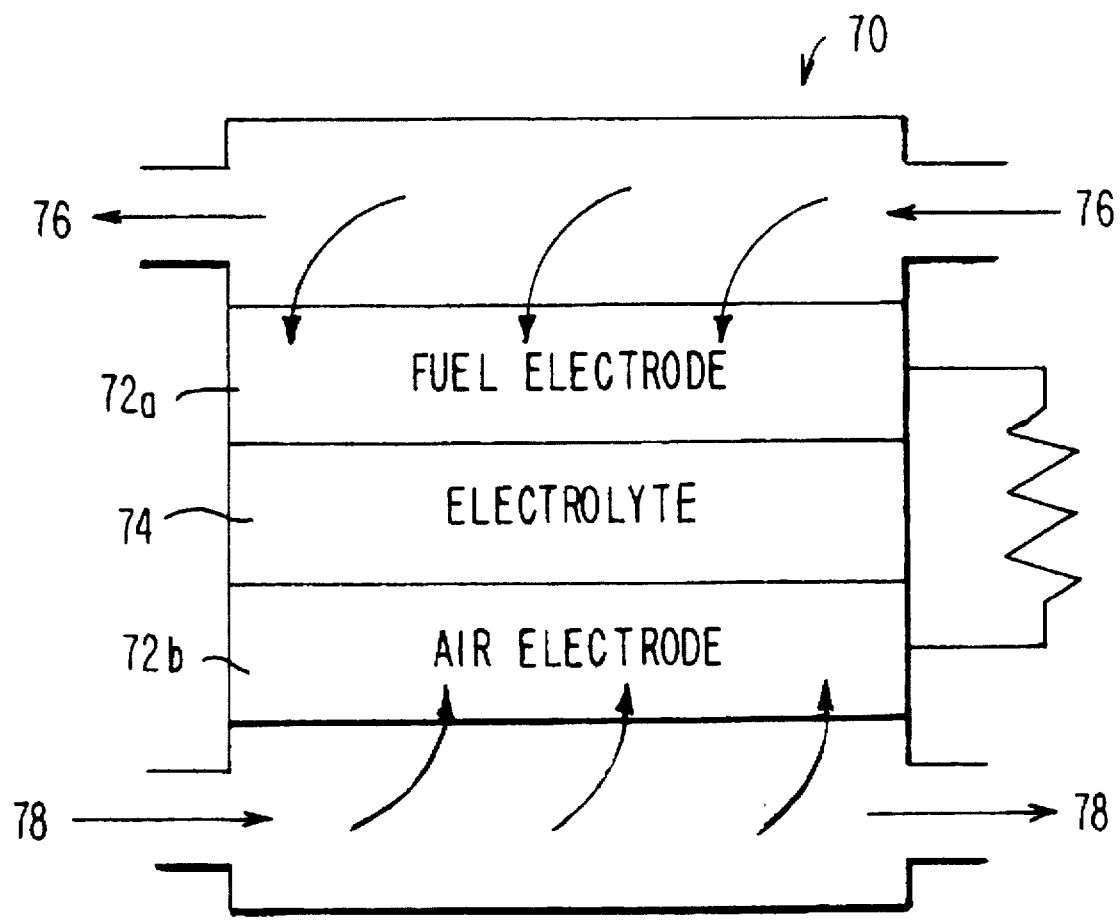
FIG. 3 is a schematic illustration of an individual hydrogen-air fuel cell.

FIG. 3 schematically shows an individual hydrogen-air fuel cell 70 that may be used as hydrogen converter 68, comprised of two electrodes, fuel electrode 72 and air electrode 73 which are separated by an electrolyte 74. Hydrogen 76 is delivered to the fuel electrode 72 which is the anode, and air 78 is delivered to the air electrode 73 which is the cathode. The hydrogen dissociates at the fuel electrode 72 into hydrogen ions and electrons. The hydrogen ions pass through the electrolyte 74 to the air electrode 73 where they combine with the electrons that have passed through the external load 75, thereby generating an electrical current.

An electric potential is established and electric current may be drawn as long as the hydrogen 76 and air 78 are supplied. The electrodes 72 and 73 catalyze the reaction but are not consumed; therefore, the fuel cell 70 has a potential for long life. The fundamental electrochemical process is highly efficient and virtually pollution-free. These characteristics are independent of output power. Individual fuel cells 70 can be assembled in series to generate practically any desired voltage. Connecting fuel cell assemblies in parallel permits practically any power output. The fuel cells 70 generate DC current, therefore a fuel cell requires a solid state invertor to produce regulated, conventional AC current.

A valuable by-product of the fuel cell is purified, potable water. Even more important, potable water can be produced as a by-product from the fuel cell when sea water is used in the electrolyzer 38. Therefore the system, in addition to producing power, can desalinate sea water to produce potable water.

The following example is being presented not as a limitation but to illustrate and provide a better understanding of the invention, as well as to illustrate the importance of certain steps utilized in the present process.

EXAMPLE

The present example utilized a photovoltaic array collecting solar energy for the power input. The photovoltaic array converts incident radiant energy to electrical energy. The two operating conditions of importance for a solar cell are its insolation or the quantity of radiant energy incident upon the photovoltaic array and the photovoltaic array temperature. For maximum power output, high insolation and low temperature are desirable. Due to these two variables, the power output varies daily. However, since the primary source of energy is the sun, it offers predictable availability, no cost, and significant environmental advantages.

The photovoltaic array's power, totaling 150 watts maximum, was derived from two Solarwest Electric ASI 16-2000™ photovoltaic panels with maximum power output of 35 W per panel and two Arco M-73™ photovoltaic panels with maximum power output of 40 W per panel.

Figure 4:
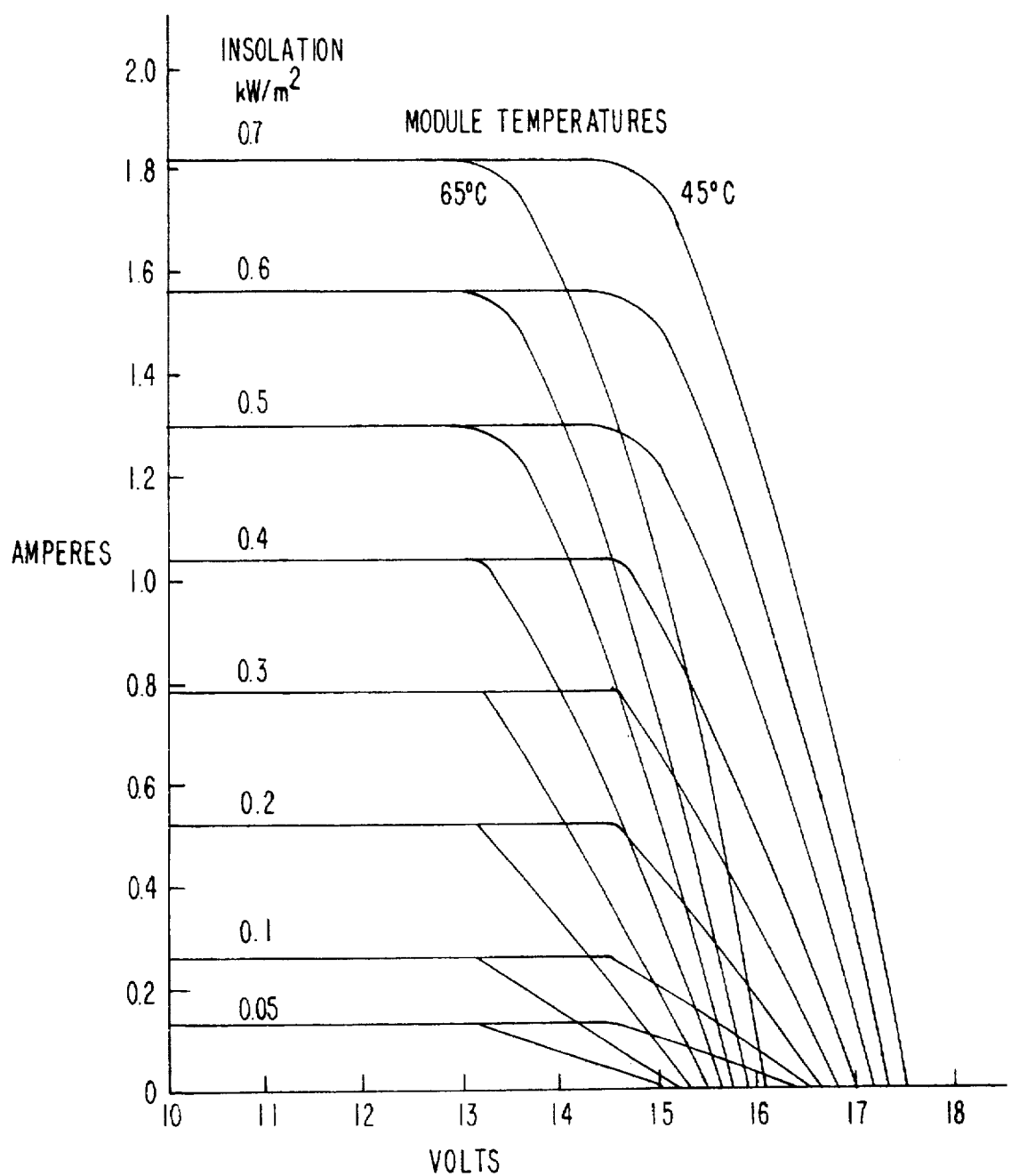
FIG. 4 is a plot of typical performance curves of a photovoltaic array which shows how performance is affected by changes in insolation and temperature.

The performance of a photovoltaic cell can be expressed graphically by a plot of current vs. voltage. A performance curve essentially is a locus of the operating points of the photovoltaic cell under various loads. FIG. 4 is a plot of typical performance curves and it shows how the performance of the photovoltaic array is affected by changes in insolation and temperature.

For an increase in temperature at a given insolation, the current is nearly constant, while the open circuit voltage decreases. However, the current is directly proportional to the level of insolation, and therefore, increasing the insolation produces an increase in current. The open circuit voltage is also affected by changes in insolation, but the effects are relatively small. One can conclude from the plot of current vs. voltage that enhanced performance occurs at high insolation and low temperatures. One important point on the performance curves is the knee of the insolation-voltage curve, which denotes the point of maximum power.

One problem that occurs when using photovoltaic panels with an electrolyzer is that the photovoltaic panels can easily exceed the maximum voltage limit of the electrolyzers. This problem is solved by the present invention by routing the direct current output from the photovoltaic array through a passive load matching device which couples the photovoltaic array to an electrolyzer. The passive load matching device is a linear current booster ("LCB") manufactured by Bobier Electronics (Bobier Electronics LCB-20™) and is designed to be adjusted to be compatible with the parameters and specifications of the photovoltaic array. The LCB provides adequate load-matching of the unsteady DC power generated by the photovoltaic array between the photovoltaic array and electrolyzer, and converts excess voltage to current, resulting in a greater production of hydrogen from the electrolyzer. As discussed below, the electrolyzers are rated with a maximum voltage of 6.8 volts. Therefore, if electric output from the photovoltaic array had a voltage greater than 6.8, the excess voltage was converted to current.

Linear current boosters were developed to regulate battery charging in photovoltaic system. However, linear current boosters have never before been used for load matching in photovoltaic panels to an electrolyzer.

It is, of course, understood that other types of load matching devices could be utilized in the present system. These other devices include, but are not limited to, using a switching network with controls to turn electrolyzer cells on and off, using a direct current motor driven by the photovoltaic panels which drives a direct current generator limited to output a fixed voltage and varying current (with necessary controls), or using a battery charging system run by the photovoltaic panels where the batteries supply electric power to the electrolyzers through a regulator and controls.

The system was designed to use three Aadco Instruments, Inc., 3-cell solid polymer electrolyte ("SPE") (perfluorinated sulfonic acid) electrolyzers, rated at 0.225 slpm maximum hydrogen gas output, and each rated at a maximum voltage of 6.8 volts and a maximum current of 14 amperes (however, one electrolyzer was malfunctioning, thus the example data was generated with only two electrolyzers). The hydrogen flow rate from the array was directly dependent on the current supplied thereto and hence an increase in hydrogen production is a result of the current-boosting capability of the power conditioning device. Deionized water with a resistance of at least 30 k$\Omega$ at standard room temperatures was required for hydrogen production. The deionized water was supplied to the electrolyzers which produced, as outputs, oxygen gas, which was safely vented (although the oxygen could be recovered as a product), and hydrogen gas. The electrolytically generated hydrogen was first dried of its water vapor content, then purified by a Matheson PF-H2 PURIFILTER™ (molecular sieve and desiccator) to less than 10 ppm impurities in order to prevent "poisoning" of the metal hydride.

It is, of course, understood that a variety of purifiers known in the art can be used so long as impurities are sufficiently removed. A method of removing impurities could also include removing oxygen contaminants from the hydrogen by using a laser to react the oxygen contaminants with the hydrogen to form water vapor which can be easily removed in the desiccator.

Once purified, the hydrogen gas was sent to metal hydride hydrogen storage tanks at pressures in the range of 0–100 psig, i.e. the pressure produced by the electrolyzers. A vacuum pump was placed between the electrolyzer and the hydrogen storage tank for purging the hydrogen flowpath as part of the startup procedure.

The hydrogen storage tank was composed of two Ergenics ST-45™ hydride tanks. Each tank was comprised of seven stainless steel-304 tubes with each tube containing six 1" OD aluminum capsules. Each capsule was filled with 250 grams of a mischmetal-nickel aluminum hydriding alloy whose chemical composition is given by $Mn_{0.97}Ni_{4.5}Al_{0.5}$, commercially known as HYSTOR-208™, and capped with a 2μ porous stainless steel filter on each end. The total hydride mass in each tank was 10.5 kilograms, which equates to over 45 standard cubic feet (1,274 standard liters) of hydrogen storage. A common inlet/outlet port provided for hydrogen charging and discharging to and from the seven tubes via a manifold.

The seven stainless steel tubes of each storage tank were surrounded by a water jacket that facilitated heat exchange during absorption and desorption of hydrogen gas in and out the metal hydride. These tanks were oversized in comparison to the electrolyzers, such that the heat of reaction during hydriding from the electrolyzer output resulted in a negligible cooling water temperature rise using normal water flow rates. Hot water for discharging the hydrogen from the tanks was provided by a Wattrimmer™ model 3E530J 120-gallon water heater.

Hydrogen gas reacted with the metal alloy granules in the hydrogen storage tank at a specific temperature and pressure according the Van't Hoff equation, liberating heat in the process (for the mischmetal-nickel aluminum hydriding alloy, this is −6.7 kcal/mol $H_2$). Heat, in the form of hot water, was supplied to the metal alloy via the heat exchanger to discharge the hydrogen gas for use in a fuel cell, a hydrogen engine, or the like to produce electricity, as required by the load. These hydriding and dehydriding reactions occurred at convenient temperatures and at pressures deliberately matched to the specifications of the electrolyzers.

Figure 5:
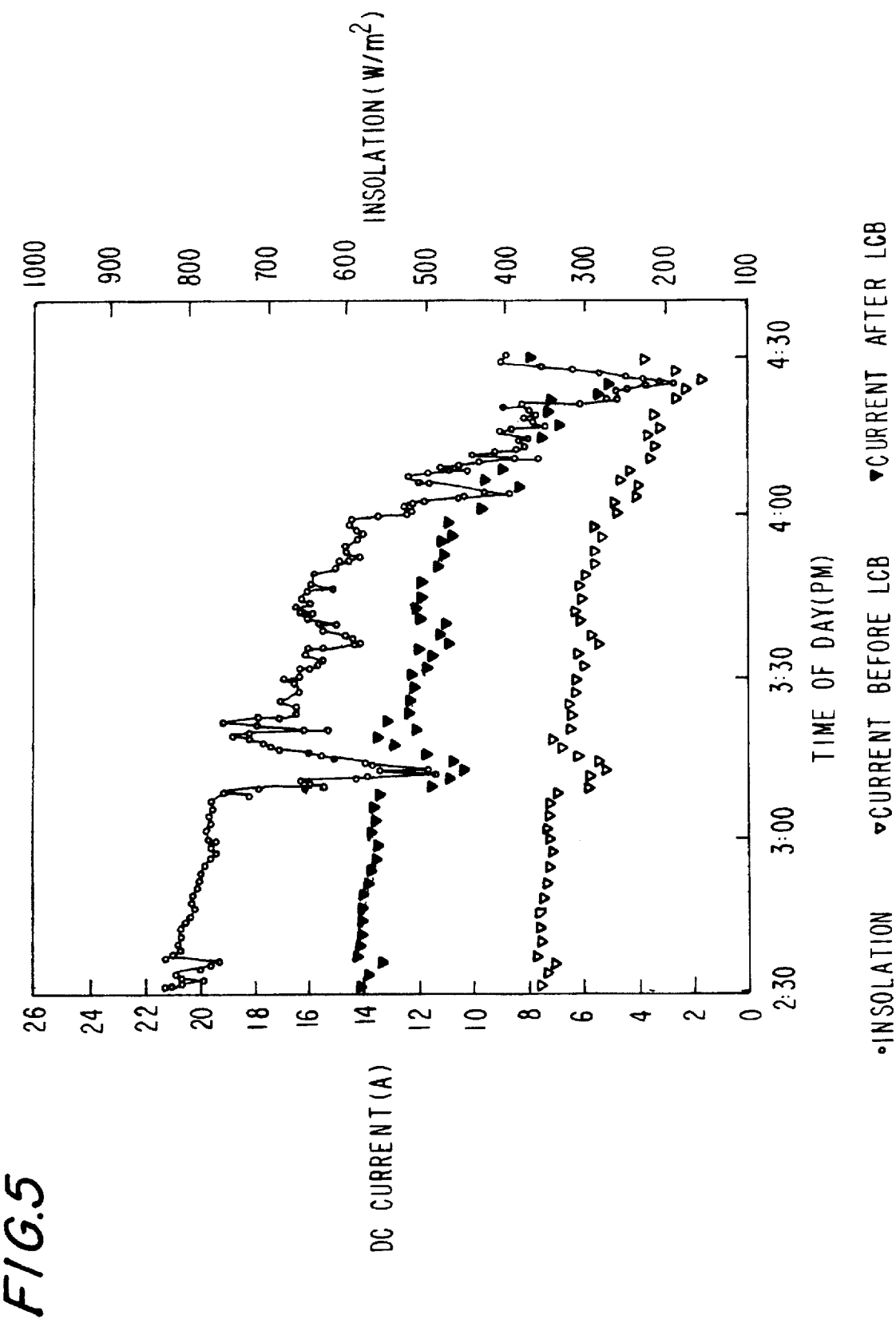
FIG. 5 is a plot of the time history of current to an electrolyzer before and after the use of a load matching device.
Figure 6:
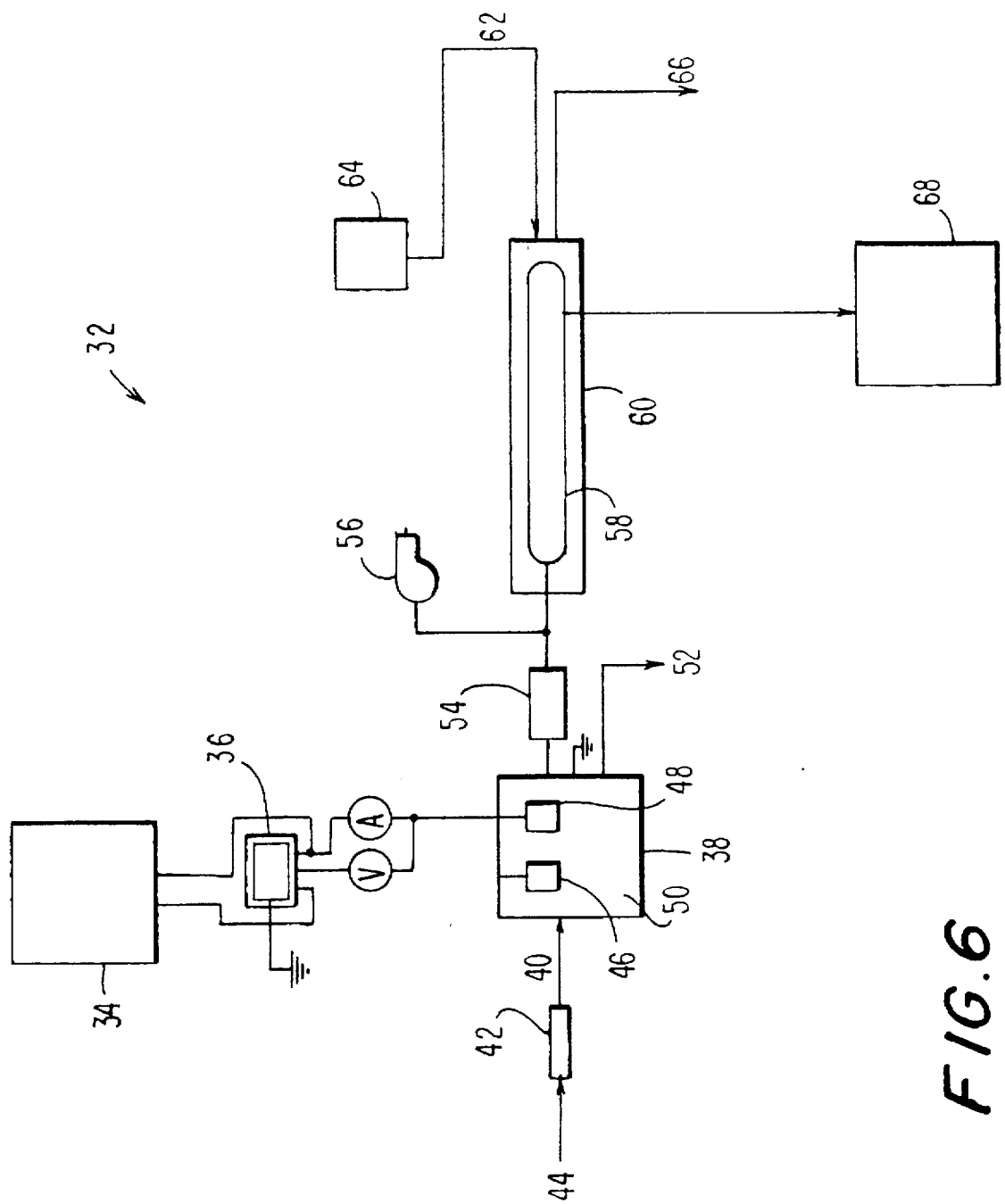
FIG. 6 is a plot of the time history of voltage to an electrolyzer before and after the use of a load matching device.

Performance data for the system are graphically shown in FIGS. 5–8. Water at a constant temperature of 26.1° C. and a flow rate of 9.5 liters per minute was piped to the hydrogen storage tank being charged. The initial tank pressure was 206.9 kPa. Charging was initiated at approximately five minutes into the test. FIG. 5 shows the time history of current upstream and downstream from the load matching device ("LCB"). The time variation of insolation is also shown in this and subsequent figures. The voltage characteristics upstream and downstream from the LCB are shown in FIG. 6. These data show that despite the unsteady nature of the insolation, the voltage at the electrolyzers (voltage after LCB) does not fluctuate significantly. The voltage drop across the LCB was accounted for by the increase in current to the electrolyzers, as indicated in FIG. 5.

Figure 7:
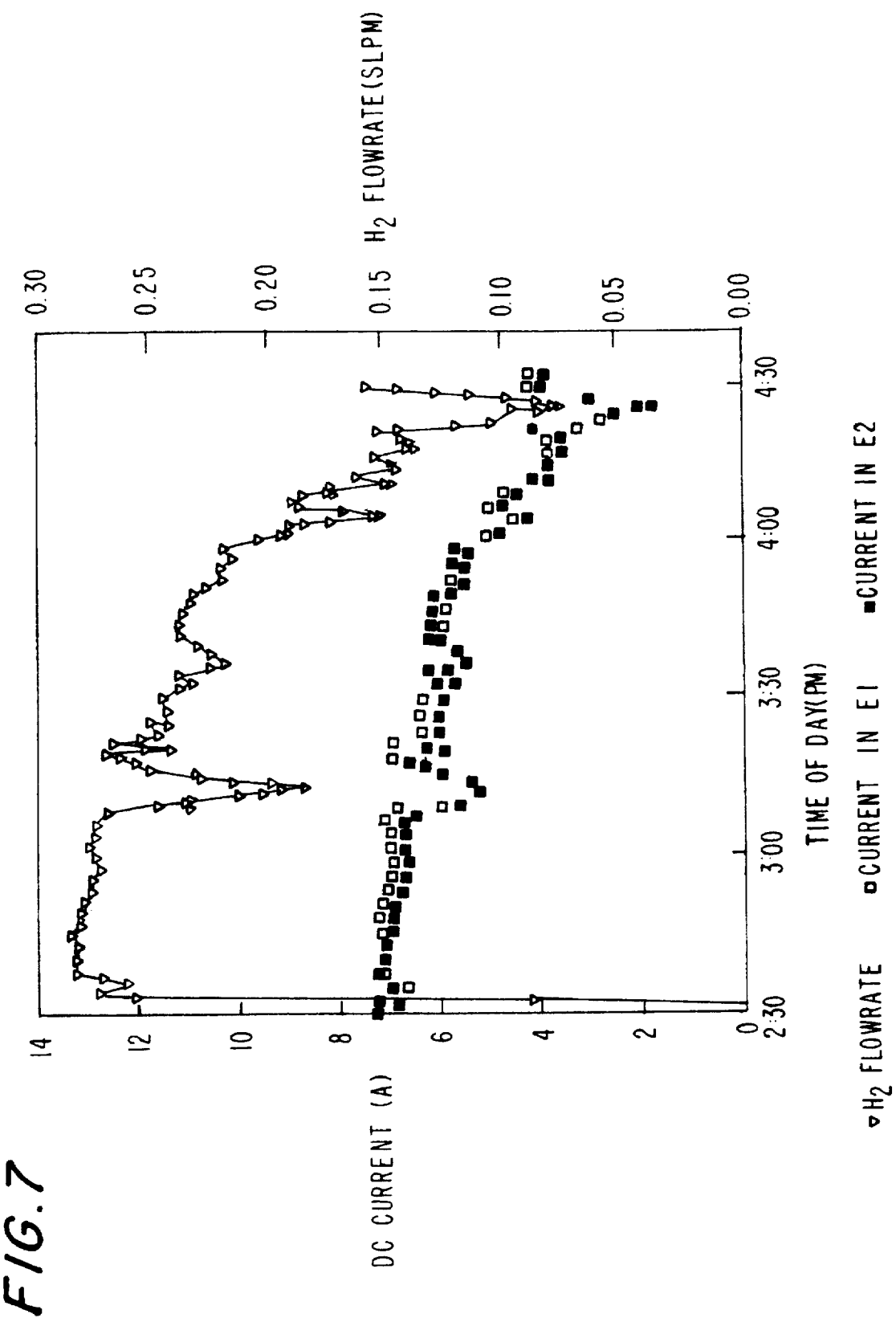
FIG. 7 is a plot of the time history of the hydrogen flowrate to the storage tank.
Figure 8:
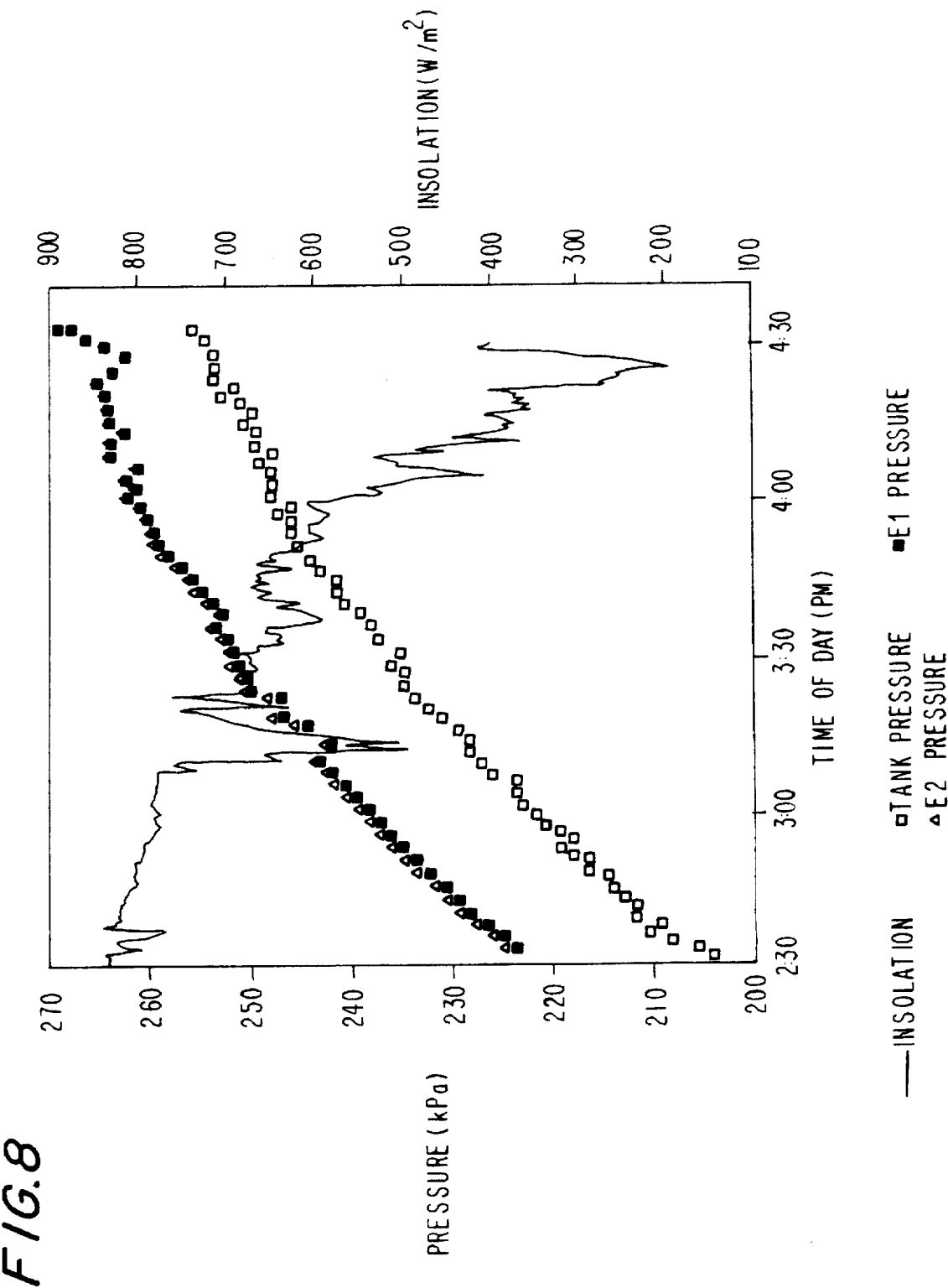
FIG. 8 is a plot of the time history of the pressure characteristics of two electrolyzers and the storage tank being charged with hydrogen therefrom.
Figure 2:
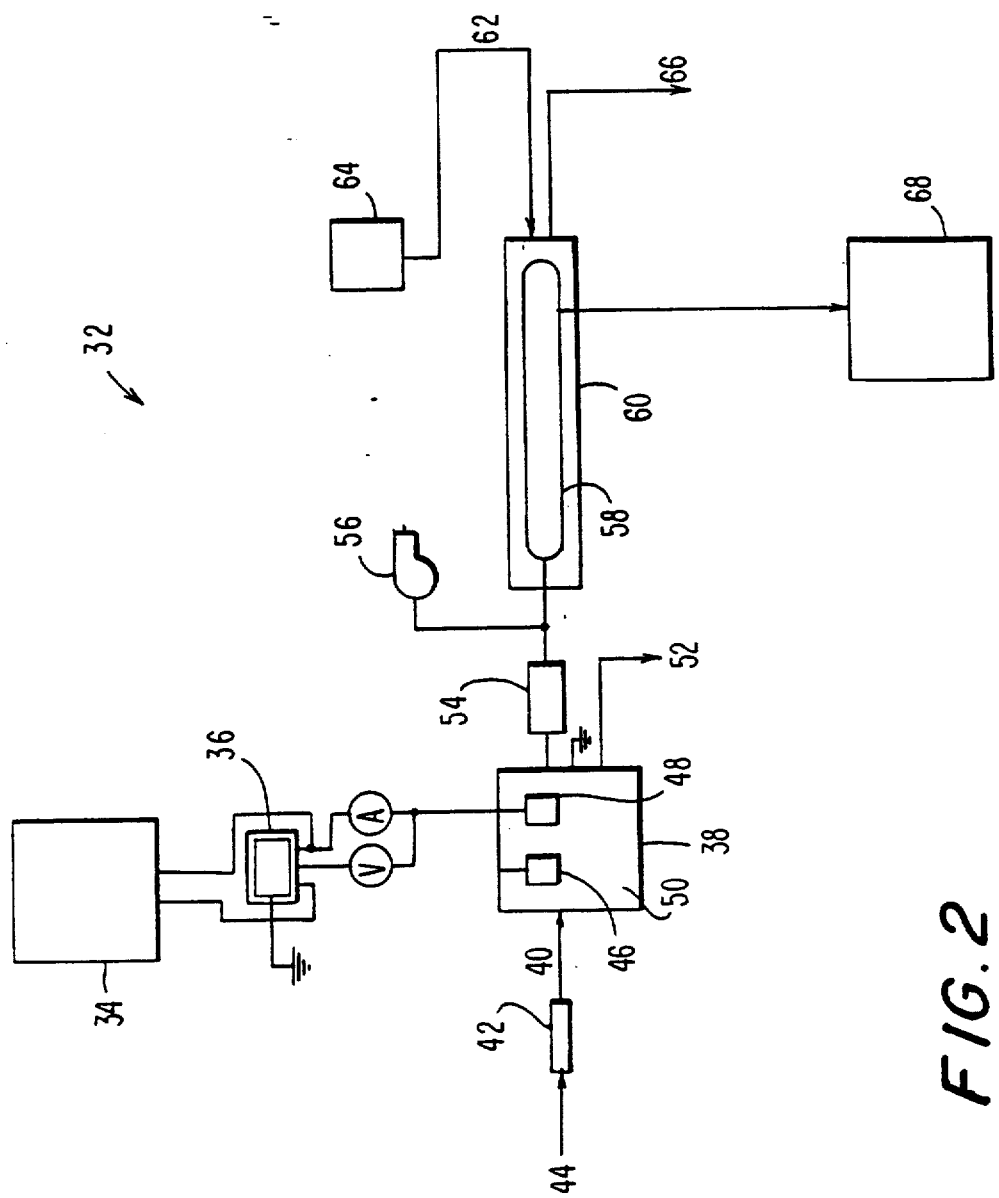
Figure 6:
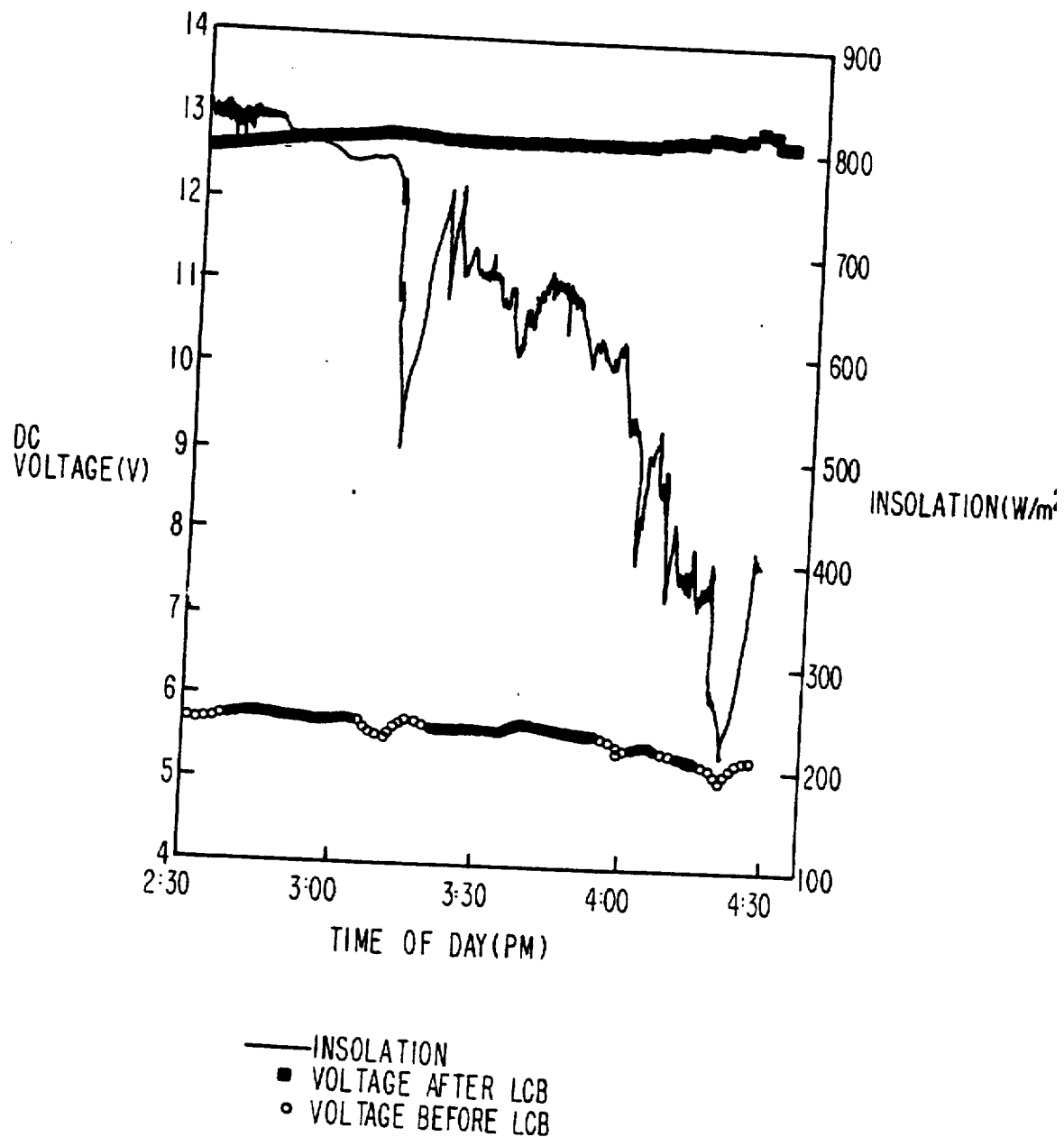

FIG. 7 shows the hydrogen flowrate to the storage tank and demonstrates that hydrogen production was insolation (or current) sensitive; that is, as insolation changes the hydrogen production changes accordingly. During this test 26.5 liters of hydrogen was produced by the electrolyzers and stored in the hydride tank. The pressure characteristics of the two electrolyzers and the tank being charged are shown in FIG. 8. The increase in tank pressure during the test was due to an increase of the hydrogen atoms to metal atoms ratio in the tank. FIG. 8 further shows that the electrolyzers and charging tank pressures do not exhibit the same unsteady behavior as the insolation.

Therefore, it was found that the system of the present invention was very effective in producing and storing hydrogen gas even when driven by an unsteady power source.

It is understood that the invention is not restricted to the detailed description of the invention, which may be modified without departure from the accompanying claims.

What is claimed is:

1. An apparatus for converting energy to hydrogen, comprising:

an electrical energy source for supplying a voltage;

an electrically operated electrolyzer operable at an optimum operating voltage to convert water into hydrogen and oxygen; and a passive load matching means electrically connecting the energy source to the electrolyzer for converting any voltage supplied by said energy sources in excess of said optimum operating voltage into current, such that water conversion within the electrolyzer is increased.

2. The apparatus of claim 1, wherein the energy source comprises a photovoltaic array for collecting solar energy and converting said solar energy to electrical power.

3. The apparatus of claim 1, wherein the energy source comprises a windmill for collecting wind power and converting said wind power to electrical power.

4. The apparatus of claim 1, wherein the energy source comprises a hydroelectric generator for collecting water power and converting the water power to electrical power.

5. The apparatus of claim 1, further comprising means for storing hydrogen gas converted by said electrolyzer.

6. The apparatus of claim 5, wherein the hydrogen gas storing mean comprises a vessel containing a metal hydride.

7. The apparatus of claim 6, wherein the metal hydride is a mischmetal-nickel aluminum hydriding alloy.

8. The apparatus of claim 7, wherein the mischmetal-nickel aluminum hydriding alloy has a chemical composition of $Mn_{0.97}Ni_{4.5}Al_{0.5}$.

9. The apparatus of claim 6, further comprising means for regulating the vessel temperature within a predetermined range, said range including a predetermined temperature for absorption of hydrogen to the metal hydride and a predetermined temperature for desorption of hydrogen from the metal hydride.

10. The apparatus of claim 9, wherein the vessel temperature regulating means comprises a water jacket surrounding the vessel.

11. The apparatus of claim 5, wherein the hydrogen gas storing means and the electrolyzer operate at pressures between about 0 to 100 psig.

12. The apparatus of claim 5, further comprising hydrogen consumption means coupled to said hydrogen gas storing means for generating energy.

13. The apparatus of claim 12, wherein the hydrogen consumption means is a hydrogen engine.

14. The apparatus of claim 12, wherein the hydrogen consumption means is a fuel cell.

15. The apparatus of claim 12, wherein the hydrogen consumption means is a hydrogen burner.

16. An apparatus for converting energy to hydrogen, comprising:

an electrical energy source;

an electrically operated electrolyzer electrically driven by said energy source to convert water into hydrogen and oxygen at pressures produced by said electrolyzer; and means coupled to said electrolyzer and containing metal hydrides for storing hydrogen gas converted by said electrolyzer at only those pressures which are produced by said electrolyzer.

17. The apparatus of claim 16, wherein the energy source comprises a photovoltaic array for collecting solar energy and converting said solar energy to electrical power.

18. The apparatus of claim 16, wherein the energy source comprises a windmill for collecting wind power and converting said wind power to electrical power.

19. The apparatus of claim 16, wherein the energy source comprises a hydroelectric generator for collecting water power and converting the water power to electrical power.

20. The apparatus of claim 16, wherein the hydrogen gas storing means comprises a vessel containing a metal hydride.

21. The apparatus of claim 20, further comprising means for regulating the vessel temperature within a predetermined range, said range including a predetermined temperature for absorption of hydrogen to the metal hydride and a predetermined temperature for desorption of hydrogen from the metal hydride.

22. The apparatus of claim 20, wherein the metal hydride is a mischmetal-nickel aluminum hydriding alloy.

23. The apparatus of claim 22, wherein the mischmetal-nickel aluminum hydriding alloy has a chemical composition of $Mn_{0.97}Ni_{4.5}Al_{0.5}$.

24. The apparatus of claim 16, wherein the hydrogen gas storing means and the electrolyzer operate at pressures between about 0 to 100 psig.

25. The apparatus of claim 16, further comprising hydrogen consumption means coupled to said hydrogen gas storing means for generating energy.

26. The apparatus of claim 25, wherein the hydrogen consumption means is a hydrogen engine.

27. The apparatus of claim 25, wherein the hydrogen consumption means is a fuel cell.

28. The apparatus of claim 25, wherein the hydrogen consumption means is a hydrogen burner.

29. The apparatus of claim 16, wherein said electrolyzer is operable at an optimum operating voltage and further comprising passive load matching means electrically connecting the energy source to the electrolyzer for converting any voltage from said energy source in excess of said optimum operating voltage into current, such that water conversion within the electrolyzer is increased.

30. An apparatus for converting energy to hydrogen, comprising:

an electrical energy source for supplying voltage;

an electrically operated electrolyzer operable at an optimum operating voltage to convert water into hydrogen and oxygen at pressures between about 0 to 100 psig;

passive load matching means electrically connecting the energy source to the electrolyzer for converting any voltage supplied by said energy source in excess of said optimum operating voltage into current, such that water conversion within the electrolyzer is increased;

means coupled to said electrolyzer for storing hydrogen gas converted thereby and comprising a vessel containing a mischmetal-nickel aluminum hydriding alloy having a chemical composition of $Mn_{0.97}Ni_{4.5}Al_{0.5}$ which operates to store hydrogen within pressures which are generated by the electrolyzer;

means for regulating the vessel temperature within a predetermined range, said range including a predetermined temperature for absorption of hydrogen to the mischmetal-nickel aluminum hydriding alloy and a predetermined temperature for desorption of hydrogen from the mischmetal-nickel aluminum hydriding alloy; and hydrogen consumption means coupled to said hydrogen gas storing means for generating energy.

31. A method for converting electrical energy to hydrogen, comprising the steps of:

(a) providing an electrical energy source;

(b) providing an electrically operated electrolyzer operable at an optimum operating voltage to convert water into hydrogen and oxygen; and (c) transferring electrical energy from the electrical energy source to the electrolyzer by a passive load matching means to convert any voltage from the energy source in excess of the optimum operating voltage into current, such that water conversion within the electrolyzer is increased.

32. The method of claim 31, wherein the step of providing an energy source comprises providing a photovoltaic array for collecting solar energy and converting the solar energy to electrical power.

33. The method of claim 31, wherein the step of providing an energy source comprises providing a windmill for collecting wind power and converting the wind power to electrical power.

34. The method of claim 31, wherein the energy source comprises a hydroelectric generator for collecting water power and converting the water power to electrical power.

35. The method of claim 31, further comprising the step of storing hydrogen gas converted by the electrolyzer.

36. The method of claim 35, wherein the hydrogen gas is stored in a vessel containing a metal hydride.

37. The method of claim 36, wherein the metal hydride is a mischmetal-nickel aluminum hydriding alloy.

38. The method of claim 37, wherein the mischmetal-nickel aluminum hydriding alloy has a chemical composition of $Mn_{0.97}Ni_{4.5}Al_{0.5}$.

39. The method of claim 36, further comprising the step of regulating the vessel temperature within a predetermined range, said range including a predetermined temperature for absorption of hydrogen to the metal hydride and a predetermined temperature for desorption of hydrogen from the metal hydride.

40. The method of claim 39, wherein the vessel temperature is regulated by a water jacket surrounding the vessel.

41. The method of claim 35, wherein the electrolyzer operates at pressures between about 0 to 100 psig and the hydrogen gas is stored at pressures between about 0 to 100 psig.

42. The method of claim 35, further comprising the step of consuming hydrogen to generate energy.

43. The method of claim 42, wherein the hydrogen is consumed by a hydrogen engine.

44. The method of claim 42, wherein the hydrogen is consumed by a fuel cell.

45. The method of claim 42, wherein the hydrogen is consumed by a hydrogen burner.

46. A method for converting electrical energy to hydrogen, comprising the steps of:

(a) providing an electrical energy source;

(b) using said electrical energy from the electrical energy source to drive an electrically operated electrolyzer operable to convert water into hydrogen and oxygen at pressures produced by said electrolyzer; and (c) storing hydrogen gas converted by said electrolyzer in a hydrogen storing means containing metal hydrides which operates to store said hydrogen gas at only those pressures which are produced by the electrolyzer.

47. The method of claim 46, wherein the energy source comprises a photovoltaic array for collecting solar energy and converting the solar energy to electrical power.

48. The method of claim 46, wherein the energy source comprises a windmill for collecting wind power and converting the wind power to electrical power.

49. The method of claim 46, wherein the energy source comprises a hydroelectric generator for collecting water power and converting the water power to electrical power.

50. The method of claim 46, wherein the hydrogen storing means comprises a vessel containing a metal hydride.

51. The method of claim 50, wherein the metal hydride is a mischmetal-nickel aluminum hydriding alloy.

52. The method of claim 51, wherein the mischmetal-nickel aluminum hydriding alloy has a chemical composition of $Mn_{0.97}Ni_{4.5}Al_{0.5}$.

53. The method of claim 50, further comprising the step of regulating the vessel temperature within a predetermined range, said range including a predetermined temperature for absorption of hydrogen to the metal hydride and a predetermined temperature for desorption of hydrogen from the metal hydride.

54. The method of claim 53, wherein the vessel temperature is regulated by a water jacket surrounding the vessel.

55. The method of claim 46, wherein the hydrogen storing means and the electrolyzer operate at pressures between about 0 to 100 psig.

56. The method of claim 46, further comprising the step of consuming hydrogen to generate energy.

57. The method of claim 56, wherein the hydrogen is consumed by a hydrogen engine.

58. The method of claim 56, wherein the hydrogen is consumed by a fuel cell.

59. The method of claim 56, wherein the hydrogen is consumed by a hydrogen burner.

60. The method of claim 46, wherein the electrolyzer is operable at an optimum operating voltage and further including the step of conditioning the electrical energy from the energy source with a passive load matching means to convert any voltage from the energy source in excess of said optimum operating voltage into current, such that water conversion within the electrolyzer is increased.

61. A method for converting electrical energy to hydrogen, comprising the steps of:

(a) providing an electrical energy source;

(b) driving an electrically operated electrolyzer with electrical energy from said energy source at an optimum operating voltage to convert water into hydrogen and oxygen;

(c) converting any voltage from said energy source in excess of the optimum operating voltage into current, such that water conversion within the electrolyzer is increased;

(d) storing hydrogen gas generated from the electrolyzer in a vessel containing a mischmetal-nickel aluminum hydriding alloy having a chemical composition of $Mn_{0.97}Ni_{4.5}Al_{0.5}$ at a storage pressure in the range from about 0 to 100 psig, and wherein the electrolyzer operates at a pressure within the range from about 0 to 100 psig;

(e) regulating the vessel temperature within a predetermined temperature range by a water jacket surrounding the vessel, said temperature range including a predetermined temperature for absorption of hydrogen to the metal hydride and a predetermined temperature for desorption of hydrogen from the metal hydride; and (f) consuming the stored hydrogen gas to generate energy.

* * * * *

UNITED STATES PATENT AND TRADEMARK OFFICE
CERTIFICATE OF CORRECTION

PATENT NO. : 5,512,145
DATED : April 30, 1996
INVENTOR(S) : Joel W. Hollenberg

It is certified that error appears in the above-indentified patent and that said Letters Patent is hereby corrected as shown below:

Delete Drawing Figs. 2 and 6, and substitute therefor the Drawing Sheets, consisting of Figs. 2 and 6, as shown on the attached pages.

Signed and Sealed this

Tenth Day of December, 1996

Attest:

BRUCE LEHMAN

Attesting Officer     Commissioner of Patents and Trademarks